(12) United States Patent
Zhao et al.

(10) Patent No.: US 12,038,413 B2
(45) Date of Patent: Jul. 16, 2024

(54) STRESS GRADIENT HIGH-EFFICIENCY NON-DESTRUCTIVE DETECTION SYSTEM BASED ON FREQUENCY DOMAIN CALCULATION OF BROADBAND SWEPT FREQUENCY SIGNALS, AND DETECTION METHOD THEREOF

(71) Applicant: Harbin Institute of Technology, Harbin (CN)

(72) Inventors: Bo Zhao, Harbin (CN); Weijia Shi, Harbin (CN); Jiaxin Li, Harbin (CN); Jiubin Tan, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 470 days.

(21) Appl. No.: 17/551,319

(22) Filed: Dec. 15, 2021

(65) Prior Publication Data

US 2023/0081998 A1 Mar. 16, 2023

(30) Foreign Application Priority Data

Sep. 10, 2021 (CN) .......................... 202111062917.0

(51) Int. Cl.
*G01N 29/34* (2006.01)
*G01N 29/07* (2006.01)
*G01N 29/30* (2006.01)
*G01N 29/44* (2006.01)
*G01N 29/46* (2006.01)

(52) U.S. Cl.
CPC ......... *G01N 29/348* (2013.01); *G01N 29/075* (2013.01); *G01N 29/30* (2013.01);
(Continued)

(58) Field of Classification Search
CPC .... G01N 29/348; G01N 29/075; G01N 29/30; G01N 29/4436; G01N 29/46;
(Continued)

(56) References Cited

FOREIGN PATENT DOCUMENTS

| CN | 102721747 A | * 10/2012 |
| CN | 102721747 A | 10/2012 |
| CN | 105203638 A | * 12/2015 |

(Continued)

OTHER PUBLICATIONS

CN-107490446-B_translated (Year: 2021).*

(Continued)

*Primary Examiner* — Manish S Shah
*Assistant Examiner* — Michael J Singletary
(74) *Attorney, Agent, or Firm* — IPRO, PLLC

(57) ABSTRACT

The disclosure discloses a stress gradient high-efficiency non-destructive detection system based on frequency domain calculation of broadband swept frequency signals, and a detection method thereof. The detection method includes: step 1: calibrating an LCR wave velocity of an object to be measured; step 2: calculating a starting frequency and a cut-off frequency of broadband swept frequency signals based on the LCR wave velocity of the object to be measured in the step 1 and a stress gradient measuring range in a depth direction of the object to be measured; step 3: converting phase delay to time delay information based on the phase delay of the starting frequency and the cut-off frequency in the step 2; and step 4: determining stresses of depths corresponding to different frequency components based on the time delay information in the step 3 to finally realize layer-by-layer scanning of stresses at different depths of the measured object. The disclosure is used to solve the problem of low stress gradient measuring accuracy, and realize the high-efficiency characterization of the stress gradient in the depth direction.

8 Claims, 3 Drawing Sheets

(52) U.S. Cl.
CPC ......... *G01N 29/4436* (2013.01); *G01N 29/46* (2013.01); *G01N 2291/0234* (2013.01); *G01N 2291/02827* (2013.01); *G01N 2291/0421* (2013.01); *G01N 2291/048* (2013.01); *G01N 2291/057* (2013.01); *G01N 2291/102* (2013.01); *G01N 2291/2694* (2013.01)

(58) Field of Classification Search
CPC ............ G01N 2291/0234; G01N 2291/02827; G01N 2291/0421; G01N 2291/048; G01N 2291/057; G01N 2291/102; G01N 2291/2694; G01N 2291/0231; G01N 29/043; G01L 1/255
See application file for complete search history.

(56) References Cited

FOREIGN PATENT DOCUMENTS

| | | | | |
|---|---|---|---|---|
| CN | 105203638 | A | 12/2015 | |
| CN | 112903820 | A * | 6/2021 | ......... G01N 29/0645 |
| CN | 112903820 | A | 6/2021 | |
| CN | 107490446 | B * | 11/2021 | ............. G01L 1/255 |

OTHER PUBLICATIONS

CN-105203638-A_translated (Year: 2015).*
CN-102721747-A_trnaslated (Year: 2012).*
CN-112903820-A_translated (Year: 2021).*

* cited by examiner

STRESS GRADIENT HIGH-EFFICIENCY NON-DESTRUCTIVE DETECTION SYSTEM BASED ON FREQUENCY DOMAIN CALCULATION OF BROADBAND SWEPT FREQUENCY SIGNALS, AND DETECTION METHOD THEREOF

TECHNICAL FIELD

The disclosure belongs to the field of ultrasonic non-destructive detection, and specifically relates to a stress gradient high-efficiency non-destructive detection system based on frequency domain calculation of broadband swept frequency signals, and a detection method thereof.

BACKGROUND

In the aerospace field, mechanical structural components always operate in complex stress states, including a tensile stress, a compressive stress and a combination of the tensile stress and the compressive stress. Such stresses have a significant impact on the strength, fatigue life and dimensional stability of the mechanical structural components, and in most cases, will reduce the strength of the components, and cause process defects such as deformation and cracks during the manufacturing process, resulting in a shortened fatigue life of the components. Therefore, grasping the stress state (stress magnitude, direction and gradient distribution) in the components is essential for performance, operating conditions and life estimation of the components. At present, there are more than a dozen stress measuring methods. According to the destructiveness to the components, the stress measuring methods can be divided into two categories: destructive detection and non-destructive detection. A non-destructive detection method can perform stress measurement by characterizing a relationship between the characteristic physical quantities such as acoustic velocity and magnetic field and the stress without damaging the use performance of the measured component. An ultrasonic method is widely used due to unique advantages such as simple measuring device and wide application range.

In the prior art, when stresses of different layers are measured, average length ranges of the stresses are different. If the uniformity of the stress along the length direction of a material is poor, the accuracy of a calculated stress gradient measurement result is greatly reduced.

The prior art only calculates an acoustic time difference between signals under stress and signals under no stress in a time domain. For a broadband transducer, an excitation signal thereof contains a large number of frequency components, and different frequency signals propagate at different depths inside a measured object. However, an acoustic time difference calculated by the time domain method cannot accurately reflect the influence of internal stresses of the measured object at different depths on different frequency components of ultrasonic signals. A stress obtained based on such acoustic time measuring method is an average stress within a certain depth range, which cannot reflect the stress gradient on the internal depth of the measured object.

When the internal stress of the measured object is measured by means of acoustic elasticity, the change of the ultrasonic velocity due to the stress is very small. Generally, a stress of 100 MPa causes about 1% change in an ultrasonic propagation velocity. Such a small change in velocity is difficult to measure. Therefore, actually, an ultrasonic stress measuring device usually characterizes the stress according to the change of the acoustic time in ultrasonic propagation within a fixed distance.

SUMMARY

The disclosure provides a stress gradient high-efficiency non-destructive detection system based on frequency domain calculation of broadband swept frequency signals, and a detection method thereof, and aims to solve the problem of low stress gradient measuring accuracy, and realize the high-efficiency characterization of the stress gradient in the depth direction.

The disclosure is implemented through the following technical solutions:

A stress gradient high-efficiency non-destructive detection system based on frequency domain calculation of broadband swept frequency signals is provided. The detection system includes an arbitrary waveform generator 1, a power amplifier 2, a transmitting probe 3, a receiving transducer 4, a high-bandwidth receiving and amplifying device 5, a single-channel high-speed data acquisition system 6 and a PC computer 7. The arbitrary waveform generator 1 is connected with the power amplifier 2, the power amplifier 2 is connected with the transmitting probe 3, the transmitting probe 3 and the receiving transducer 4 are both disposed on a calibration device, the receiving transducer 4 is connected with the high-bandwidth receiving and amplifying device 5, the high-bandwidth receiving and amplifying device 5 is connected with the single-channel high-speed data acquisition system 6, and the single-channel high-speed data acquisition system 6 is connected with the PC computer 7.

Further, the calibration device includes a transmitting probe 3, a receiving transducer 4, a wedge block I 53 and a wedge block II 55. The wedge block I 53 and the wedge block II 55 are separated at two ends of a measured object 51, the transmitting probe 3 is disposed on the wedge block I 53 or the wedge block II 55, the receiving transducer 4 is disposed on the wedge block II 55 or the wedge block I 53, the transmitting probe 3 and the receiving transducer 4 are disposed oppositely, and the wedge block I 53 or the wedge block II 55 is located on a plane.

A detection method of the stress gradient high-efficiency non-destructive detection system based on frequency domain calculation of broadband swept frequency signals is provided. The stress gradient high-efficiency non-destructive detection method includes the following steps:

step 1: calibrating an LCR wave velocity of an object to be measured;

step 2: calculating a starting frequency and a cut-off frequency of broadband swept frequency signals based on the LCR wave velocity of the object to be measured in the step 1 and a stress gradient measuring range in a depth direction of the object to be measured;

step 3: converting phase delay to time delay information based on the phase delay of the starting frequency and the cut-off frequency in the step 2; and step 4: determining stresses of the depths corresponding to different frequency components based on the time delay information in the step 3 to finally realize layer-by-layer scanning of the stresses at different depths of the measured object.

Further, a calibration device for calibrating the LCR wave velocity of the object to be measured in the step 1 includes a transmitting probe 3, a receiving transducer 4, a wedge block I 53 and a wedge block II 55. The wedge block I 53 and the wedge block II 55 are separated at two ends of a measured object 51, the transmitting probe 3 is disposed on the wedge block I 53 or the wedge block II 55, the receiving transducer 4 is disposed on the wedge block II 55 or the wedge block I 53, the transmitting probe 3 and the receiving transducer 4 are disposed oppositely, and the wedge block I 53 or the wedge block II 55 is located on a plane.

Further, a propagation velocity of the wedge block in the calibration device in the step 1 is known, and a propagation velocity of the LCR wave of the measured object 51 is calculated by the refraction law; the transmitting probe 3 is excited by a 5-period sine wave modulated by a Hanning window, and at the same time, a data acquisition board is triggered to acquire ultrasonic signals of the receiving transducer 4; deflection angles of the receiving and transmitting probes are adjusted, and the energy of received signals is calculated; when the deflection angles of the receiving and transmitting probes meet a first critical refraction angle, the energy of the signal received by the receiving transducer is the highest; and at this time, the propagation velocity of the LCR wave of the measured object meets:

$$c = \frac{c_0}{\sin\theta_0}, \tag{1}$$

where $c_0$ represents the propagation velocity of the wedge block, and $\vartheta_0$ represents the deflection angle of the wedge block.

Further, the step 2 is specifically as follows: a stress gradient measuring range in a depth direction of the measured object is determined, a starting depth of the measurement is $d_0$, a cut-off depth of the measurement is $d_1$, a starting frequency of linear swept frequency signals is $f_0 = c/d_1$, a cut-off frequency is $f_1 = c/d_0$, a bandwidth of swept frequency signals is $B = f_1 - f_0$, a pulse width of excitation signals is set as T, and then, broadband swept frequency signals can be expressed as:

$$S = \exp(j2\pi B t^2 / T) \tag{2};$$

and the generated broadband swept frequency signal data is loaded into the arbitrary waveform generator so as to generate broadband swept frequency signals for exciting the transmitting probe.

Further, the step 3 is specifically as follows: excitation signals of the transmitting probe and acquisition signals of the receiving transducer are respectively subjected to Fast Fourier Transform (FFT), the signals after the FFT not only contain the amplitude information of each frequency component, but also contain the phase information, a phase difference between two signals at the same frequency is calculated, and a relationship between the phase difference $\Delta\varphi$ and the propagation delay of ultrasonic signals meets:

$$\Delta\varphi = w\Delta t \tag{3},$$

where w represents an angular frequency of signals, and $\Delta t$ represents delay time of the signal corresponding to the angular frequency.

Further, the step 4 is specifically as follows:
during the FFT, original signals are expanded, that is, the number of points of the FFT is increased so as to improve a frequency resolution after the FFT and correspondingly improve a stress gradient spatial resolution in the depth direction, the delay times of different frequency components in broadband swept frequency signals are calculated to obtain stresses of different internal depth layers corresponding to the measured object, and finally, the stress gradient measurement in the depth direction of the measured object is realized by means of the superposition relationship of the stresses; and if a measurement depth corresponding to a frequency $f_1$ is $D_1$ and a measured stress value thereof is $\sigma_1$; and a measurement depth corresponding to a frequency $f_2$ is $D_2$ and a measured stress value thereof is $\sigma_2$, a stress value $\sigma_{1-2}$ of the $D_{1-2}$ layer is:

$$\sigma_{1-2} = \frac{\sigma_2 \times (D_2 L) - \sigma_1 \times (D_1 L)}{D_2 L - D_1 L}. \tag{4}$$

The disclosure has the following beneficial effects:

A panel of ultrasonic probes with arbitrarily adjustable deflection angles are used in the measuring device of the disclosure. According to the condition that the energy of the LCR wave obtained by the receiving transducer is maximum when the deflection angles of the receiving and transmitting probes meet the first critical refraction law, the high-precision characterization of the propagation velocity of the LCR wave is realized. The whole measuring device is simple and easy to operate.

In the disclosure, according to the stress detection depths of LCR waves of different frequencies and the target detection range in the depth direction of the measured object, the starting frequency and the cut-off frequency of broadband swept frequency signals are calculated, and corresponding linear swept frequency signals are generated as the excitation signals of the ultrasonic probes to ensure that the wavelength range of the ultrasonic waves excited by the ultrasonic probes completely covers the target detection depth. Compared with the traditional narrowband signal excitation of multiple panels of probes to cover the detection depth, such excitation mode of high-bandwidth probes matched with swept frequency signals reduces the detection cost and improves the convenience of detection.

In the disclosure, the original excitation signals and the ultrasonic signals acquired by the receiving transducer are subjected to FFT to calculate phase delays corresponding to different frequencies, which can be converted to time delays in a time domain according to a formula, and the time delays corresponding to different frequencies correspond to the stresses of different detection depths, so as to calculate the stress gradient in the target depth range of the measured object. One advantage of calculating the acoustic time difference by a frequency domain method is that the effect of the Gaussian white noise in the original signals can be greatly weakened, so as to effectively improve the anti-interference ability of acoustic time difference calculation.

DETAILED DESCRIPTION

Figure 1:
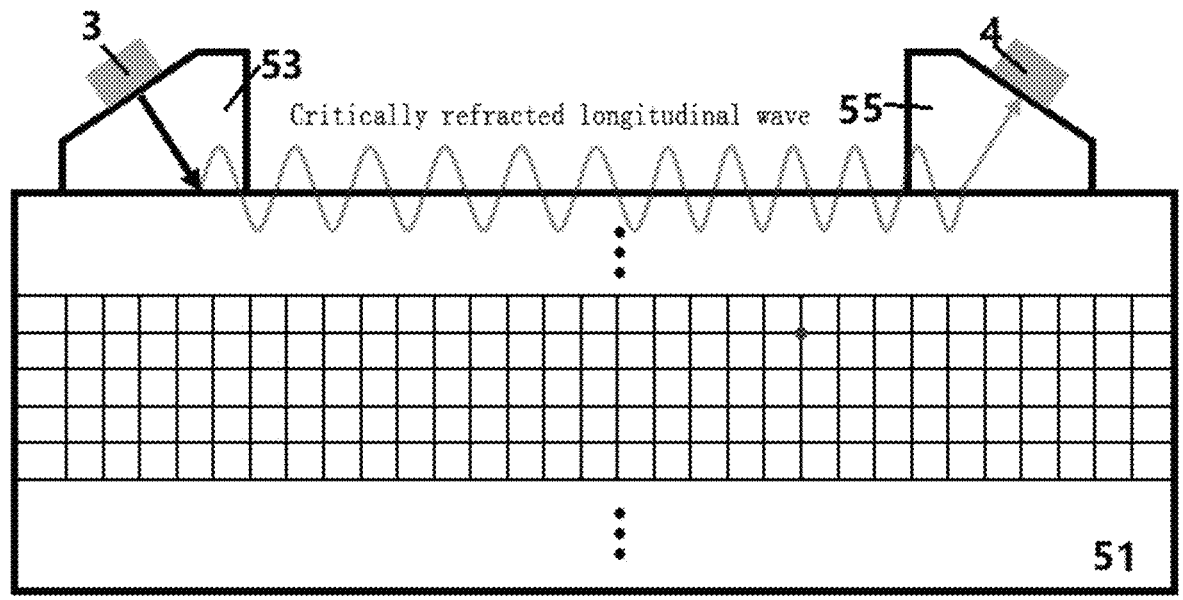
FIG. 1 is a schematic diagram of a calibration device of the disclosure.
Figure 2:
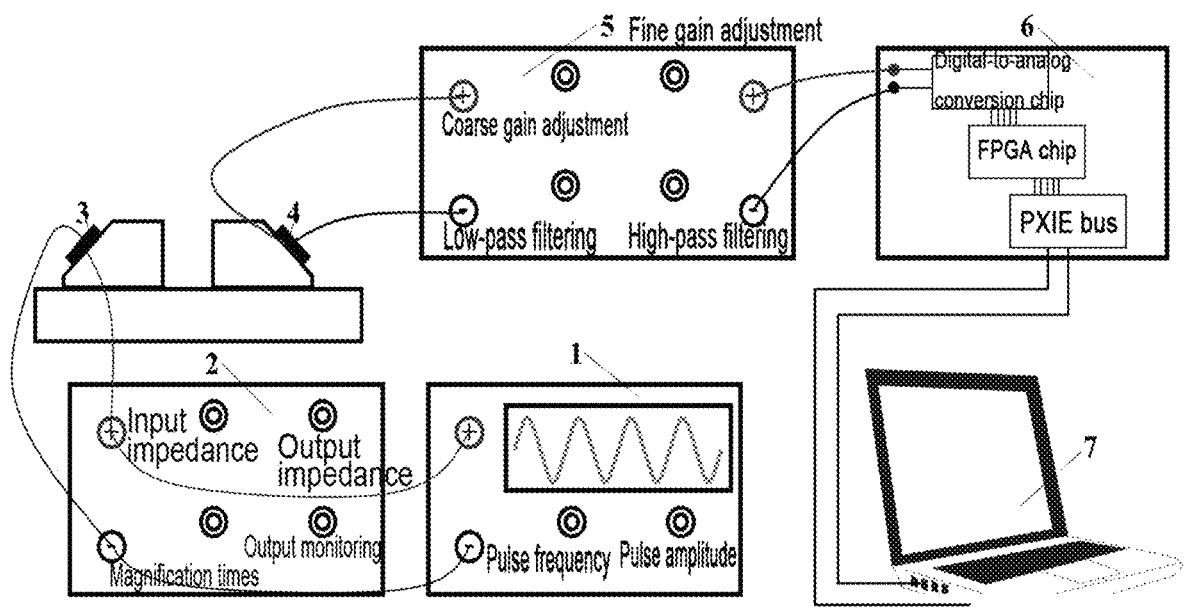
FIG. 2 is a schematic diagram of a measuring system of the disclosure.
Figure 3:
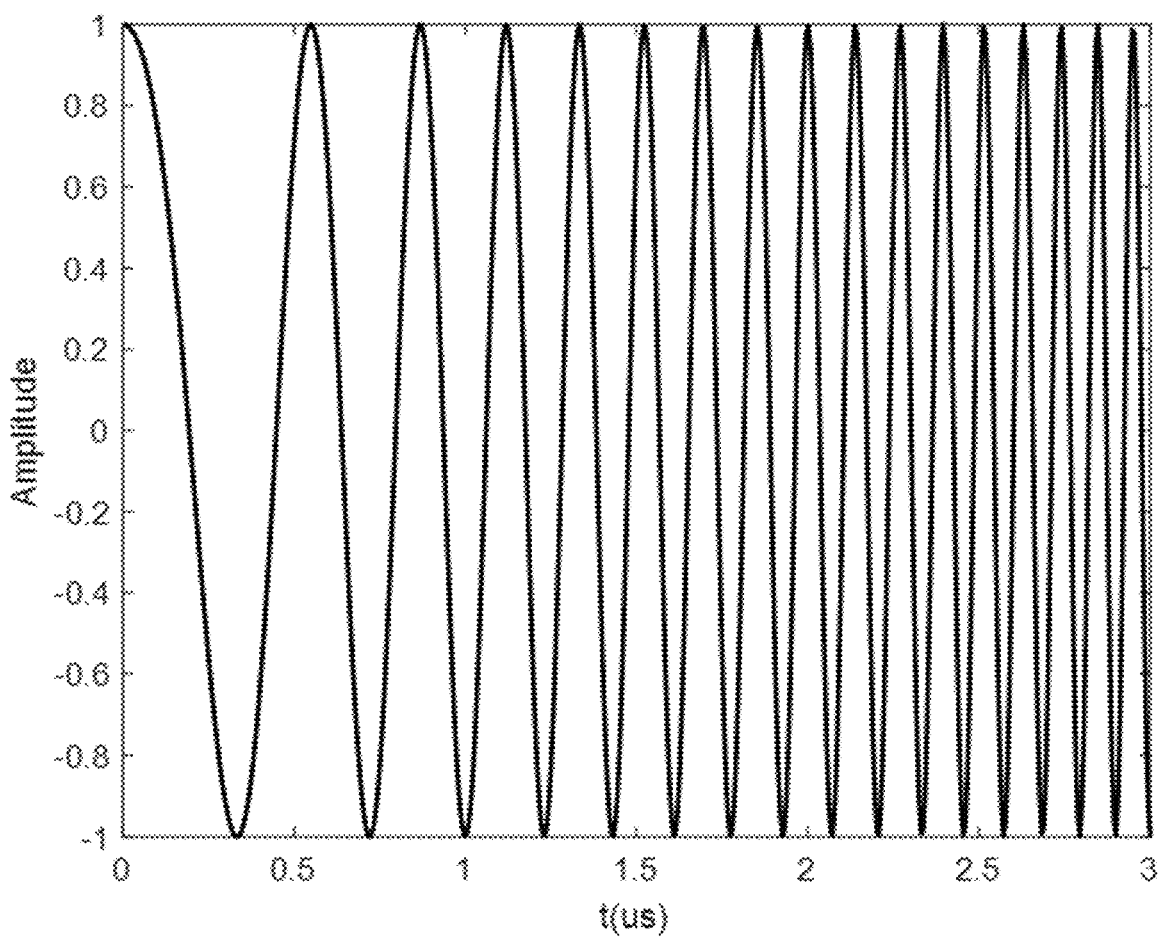
FIG. 3 is a time domain waveform diagram of broadband swept frequency signals of the disclosure.
Figure 4:
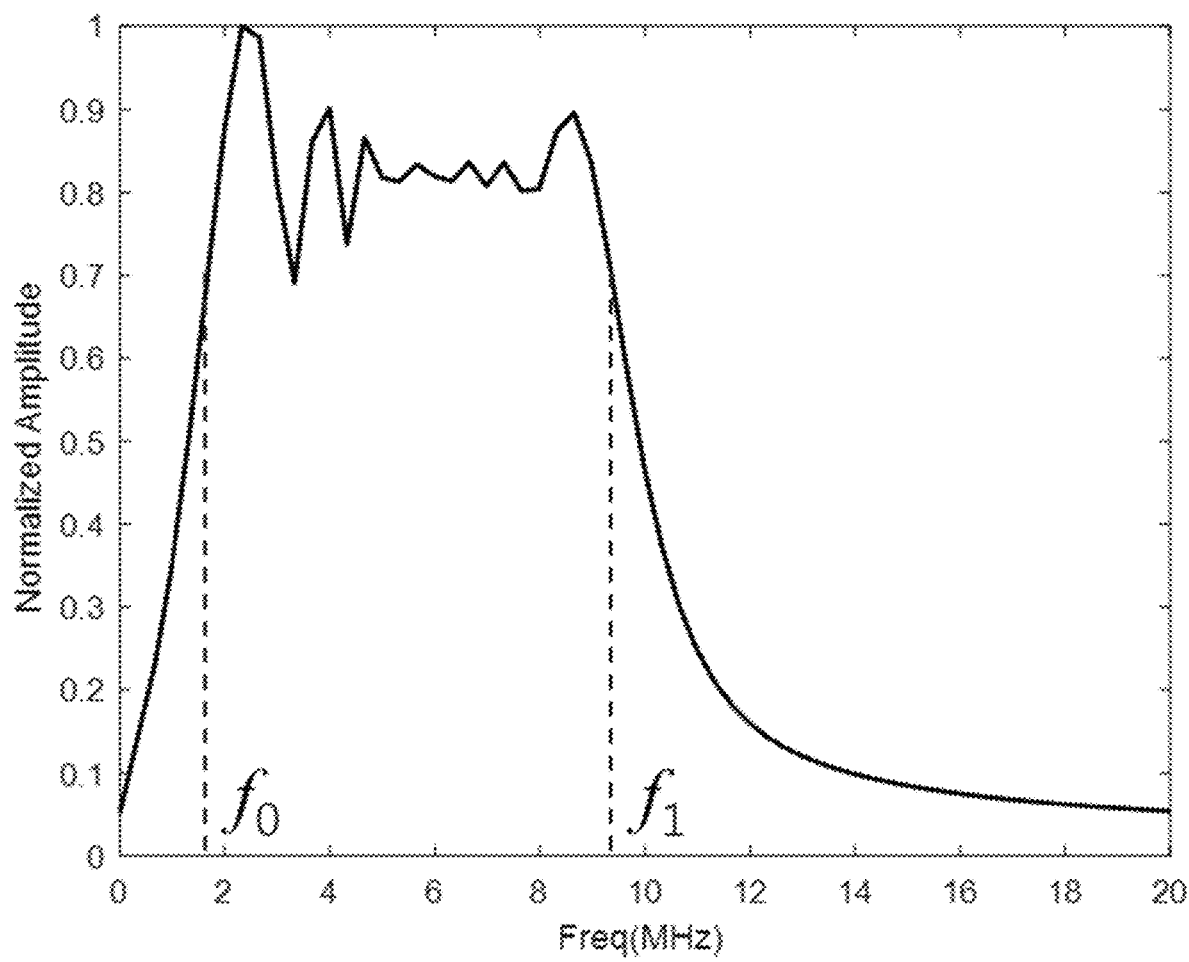
FIG. 4 is a frequency domain waveform diagram of broadband swept frequency signals of the disclosure.
Figure 5:
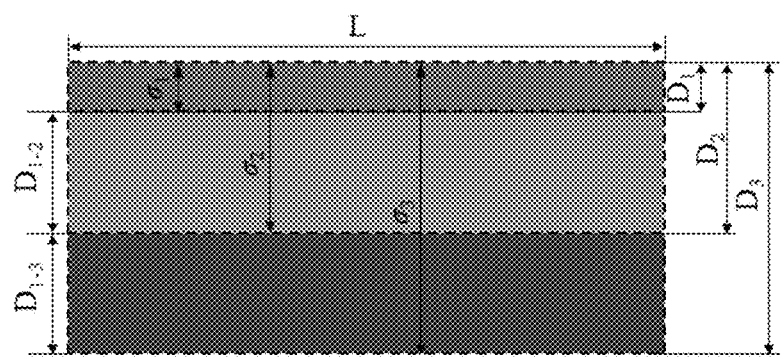
FIG. 5 is an ultrasonic detection model diagram of the stress gradient of the disclosure.

The technical solutions in the examples of the disclosure will be clearly and completely described below with reference to the drawings in the examples of the disclosure. It is apparent that the described examples are only a part of the examples of the disclosure, but are not all of the examples. Based on the examples in the disclosure, all other examples obtained by those skilled in the art without creative efforts fall within the scope of protection of the disclosure.

Example 1

A stress gradient high-efficiency non-destructive detection system based on frequency domain calculation of broadband swept frequency signals is provided. The detection system includes an arbitrary waveform generator 1, a power amplifier 2, a transmitting probe 3, a receiving transducer 4, a high-bandwidth receiving and amplifying device 5, a single-channel high-speed data acquisition system 6 and a PC computer 7. The arbitrary waveform generator 1 is connected with the power amplifier 2, the power amplifier 2 is connected with the transmitting probe 3, the transmitting probe 3 and the receiving transducer 4 are both disposed on a calibration device, the receiving transducer 4 is connected with the high-bandwidth receiving and amplifying device 5, the high-bandwidth receiving and amplifying device 5 is connected with the single-channel high-speed data acquisition system 6, and the single-channel high-speed data acquisition system 6 is connected with the PC computer 7.

Further, a positive electrode of the arbitrary waveform generator 1 is connected with a positive electrode of the power amplifier 2, a negative electrode of the arbitrary waveform generator 1 is connected with a negative electrode of the power amplifier 2, the positive electrode of the power amplifier 2 is connected with the transmitting probe 3, the negative electrode of the power amplifier 2 is connected with the transmitting probe 3, the transmitting probe 3 and the receiving transducer 4 are both disposed on a calibration device, the receiving transducer 4 is connected with a positive electrode of the high-bandwidth receiving and amplifying device 5, the receiving transducer 4 is connected with a negative electrode of the high-bandwidth receiving and amplifying device 5, the positive electrode of the high-bandwidth receiving and amplifying device 5 is connected with a positive electrode of a digital-to-analog conversion chip in the single-channel high-speed data acquisition system 6, the negative electrode of the high-bandwidth receiving and amplifying device 5 is connected with a negative electrode of the digital-to-analog conversion chip in the single-channel high-speed data acquisition system 6, the digital-to-analog conversion chip in the single-channel high-speed data acquisition system 6 is connected with an FPGA chip in the single-channel high-speed data acquisition system 6, the FPGA chip in the single-channel high-speed data acquisition system 6 is connected with a PXIE bus in the single-channel high-speed data acquisition system 6, and the PXIE bus in the single-channel high-speed data acquisition system 6 is connected with the PC computer 7.

A signal generated by the arbitrary waveform generator 1 is a low-voltage swept frequency signal which must be amplified by the power amplifier 2 before the transmitting probe 3 can be excited. The LCR wave propagates along an upper surface of the measured object and is received by the receiving transducer 4. The received signal is an mV-order weak signal, which is not easy to be acquired and is easily interfered by random electronic noise, so that it is necessary to perform non-distortion amplification on the original signal and then perform bandwidth filtering on the amplified signal. The original signal obtained by the receiving transducer 4 is input into the high-bandwidth receiving and amplifying device 5, the signal is amplified to an input range of the digital-to-analog conversion chip through coarse gain adjustment and fine gain adjustment, then a lower cut-off frequency and an upper cut-off frequency of a low-pass filter are set according to the bandwidth of the swept frequency signal, the amplified and filtered signal is input into the single-channel high-speed data acquisition system 6, and is encoded through the FPGA chip, and the sampling signal is transmitted into an upper computer 7 by the PXIE bus and stored for subsequent off-line processing.

Further, the calibration device includes a transmitting probe 3, a receiving transducer 4, a wedge block I 53 and a wedge block II 55. The wedge block I 53 and the wedge block II 55 are separated at two ends of a measured object 51, the transmitting probe 3 is disposed on the wedge block I 53 or the wedge block II 55, the receiving transducer 4 is disposed on the wedge block II 55 or the wedge block I 53, the transmitting probe 3 and the receiving transducer 4 are disposed oppositely, and the wedge block I 53 or the wedge block II 55 is located on a plane.

A detection method of the stress gradient high-efficiency non-destructive detection system based on frequency domain calculation of broadband swept frequency signals is provided. The stress gradient high-efficiency non-destructive detection method includes the following steps:

in step 1, an LCR wave velocity of an object to be measured is calibrated; because a propagation velocity of ultrasonic waves and an excitation frequency jointly determine the wavelength of the ultrasonic waves and the wavelength determines a stress measurement depth of the LCR wave, it is very important to perform high-precision characterization of the propagation velocity of the LCR wave of the object to be measured;

in step 2, a starting frequency and a cut-off frequency of broadband swept frequency signals are calculated based on the LCR wave velocity of the object to be measured in the step 1 and a stress gradient measuring range in a depth direction of the object to be measured; a mathematical tool is used to generate corresponding waveform data which is to be loaded into a waveform generator to generate a corresponding waveform; an excitation signal generated by the waveform generator is amplified by a power amplifier and then connected to a transmitting transducer, a signal of a receiving transducer at the other end is amplified by a first-order weak signal, then received by a high-speed acquisition board and transmitted to an upper computer through a PXIE bus, and the signal is stored for off-line processing; the excitation signal and the received signal are subjected to FFT to calculate different frequency components;

in step 3, phase delay is converted to time delay information based on the phase delay of the starting frequency and the cut-off frequency in the step 2; and in step 4, stresses of the depths corresponding to different frequency components are determined based on the time delay information in the step 3 to finally realize layer-by-layer scanning of the stresses at different depths of the measured object.

Further, a calibration device for calibrating the LCR wave velocity of the object to be measured in the step 1 includes a transmitting probe 3, a receiving transducer 4, a wedge block I 53 and a wedge block II 55. The wedge block I 53 and the wedge block II 55 are separated at two ends of a measured object 51, the transmitting probe 3 is disposed on the wedge block I 53 or the wedge block II 55, the receiving transducer 4 is disposed on the wedge block II 55 or the wedge block I 53, the transmitting probe 3 and the receiving transducer 4 are disposed oppositely, and the wedge block I 53 or the wedge block II 55 is located on a plane.

Further, the propagation velocity of the wedge block in the calibration device in the step 1 is known, and the propagation velocity of the LCR wave of the measured object 51 is calculated by the refraction law; the transmitting probe 3 is excited by a 5-period sine wave modulated by a Hanning window, and at the same time, a data acquisition board is triggered to acquire ultrasonic signals of the receiving transducer 4. The deflection angles of the receiving and transmitting probes are constantly adjusted, and the energy of received signals is calculated. The deflection angles of the receiving and transmitting probes need to be synchronously adjusted with high precision, and the adjustment accuracy of the angle has a certain influence on velocity calibration. When the deflection angles of the receiving and transmitting probes meet a first critical refraction angle, the energy of the signal received by the receiving transducer is the highest. At this time, the propagation velocity of the LCR wave of the measured object meets:

$$c = \frac{c_0}{\sin\theta_0}, \quad (1)$$

where $c_0$ represents the propagation velocity of the wedge block, and $\vartheta_0$ represents the deflection angle of the wedge block.

Further, the step 2 is specifically as follows: after the calibration of the propagation velocity of the LCR wave is completed, broadband swept frequency signals are generated as excitation signals of the transmitting probe; the stress gradient measuring range in the depth direction of the measured object is determined, a starting depth of the measurement is $d_0$, and a cut-off depth of the measurement is $d_1$; and because the stress measurement depth of the critically refracted longitudinal wave is related to the wavelength thereof and the energy of the acoustic wave is mainly concentrated in a wavelength range, a starting frequency of linear swept frequency signals is $f_0 = c/d_1$, a cut-off frequency is $f_1 = c/d_0$, a bandwidth of swept frequency signals is $B = f_1 - f_0$, a pulse width of excitation signals is set as T, and then, broadband swept frequency signals can be expressed as:

$$S = \exp(j2\pi B t^2/T) \quad (2);$$

and the generated broadband swept frequency signal data is loaded into the arbitrary waveform generator so as to generate broadband swept frequency signals for exciting the transmitting probe.

Further, the step 3 is specifically as follows: excitation signals of the transmitting probe and acquisition signals of the receiving transducer are respectively subjected to FFT, the signals after the FFT not only contain the amplitude information of each frequency component, but also contain the phase information, a phase difference between two signals at the same frequency is calculated, and a relationship between the phase difference $\Delta\varphi$ and the propagation delay of ultrasonic signals meets:

$$\Delta\varphi = w\Delta t \quad (3),$$

where $w$ represents an angular frequency of signals, and $\Delta t$ represents delay time of the signal corresponding to the angular frequency.

Further, the step 4 is specifically as follows:
during the FFT, original signals are expanded, that is, the number of points of the FFT is increased so as to improve a frequency resolution after the FFT and correspondingly improve a stress gradient spatial resolution in the depth direction, the delay times of different frequency components in broadband swept frequency signals are calculated to obtain stresses of different internal depth layers corresponding to the measured object, and finally, the stress gradient measurement in the depth direction of the measured object is realized by means of the superposition relationship of the stresses; and if a measurement depth corresponding to a frequency $f_1$ is $D_1$ and a measured stress value thereof is $\sigma_1$; and a measurement depth corresponding to a frequency $f_2$ is $D_2$ and a measured stress value thereof is $\sigma_2$, a stress value $\sigma_{1-2}$ of the $D_{1-2}$ layer is:

$$\sigma_{1-2} = \frac{\sigma_2 \times (D_2 L) - \sigma_1 \times (D_1 L)}{D_2 L - D_1 L}. \quad (4)$$

According to the measuring range of the stress gradient in the depth direction inside the measured object, the starting frequency and the cut-off frequency of swept frequency signals are set, excitation signals of the ultrasonic transducer and received pulse signals are respectively subjected to frequency domain transformation, the phase delays of different frequency components are calculated, and then, the acoustoelastic effect of the internal stress of the measured object on different frequency components in the swept frequency signals can be determined according to the corresponding relationship between the phase change and the acoustic time difference. Because the signals of different frequency components correspond to different measurement depths, the layer-by-layer calculation of the internal stress of the measured object can be realized through the frequency domain calculation of the broadband swept frequency signals, and finally, the high-efficiency characterization of the stress gradient in the depth direction can be obtained.

Example 2

At normal temperature, a measured object is an aluminum plate which is an isotropic material, a propagation velocity of an LCR wave inside the aluminum plate is 6300 m/s, a target depth measuring range is 1 mm to 10 mm, and then, a starting frequency and a cut-off frequency of broadband swept frequency signals can be 0.6 MHz and 6 MHz as calculated. A broadband swept frequency signal waveform is generated by EasyWave software, and then, the data is imported into a Dingyang signal generator in a USB communication mode. Low-frequency signals generated by the signal generator are subjected to first-stage amplification by an Antai power amplifier, the ultrasonic probe is excited by high-voltage swept frequency signals, trigger signals are generated at the same time, and ultrasonic signals obtained by the receiving transducer are acquired by a high-speed data acquisition board. Before the received signals are acquired, the signals are subjected to weak signal processing and band-pass filtering first, the signals are amplified to an input voltage range of the data acquisition board, and low-frequency noise and high-frequency noise in the signals are filtered out at the same time. The received signals are acquired continuously 10 times, and the acquired signals are subjected to smooth filtering to filter out a part of electronic noise to improve a signal-to-noise ratio of the received signals. In order to obtain an absolute stress value inside the measured object, a zero-stress measurement sample must be measured first. When the zero-stress sound of different frequency signals is obtained, the actually measured sample is measured. When the actual sound of different frequency signals is obtained, stress values at different depths inside the measured object are calculated according to an acoustoelastic coefficient of the measured object and an acoustic time difference between the actually measured sample and the zero-stress sample. Finally, the stress gradient characterization in the target depth range is obtained according to the superposition relationship of the stresses.

What is claimed is:

1. A stress gradient high-efficiency non-destructive detection system based on frequency domain calculation of broadband swept frequency signals, comprising an arbitrary waveform generator (1), a power amplifier (2), a transmitting probe (3), a receiving transducer (4), a high-bandwidth receiving and amplifying device (5), a single-channel high-speed data acquisition system (6) and a PC computer (7), wherein the arbitrary waveform generator (1) is connected with the power amplifier (2), the power amplifier (2) is connected with the transmitting probe (3), the transmitting probe (3) and the receiving transducer (4) are both disposed on a calibration device, the receiving transducer (4) is connected with the high-bandwidth receiving and amplifying device (5), the high-bandwidth receiving and amplifying device (5) is connected with the single-channel high-speed data acquisition system (6), and the single-channel high-speed data acquisition system (6) is connected with the PC computer (7).

2. The stress gradient high-efficiency non-destructive detection system based on frequency domain calculation of broadband swept frequency signals according to claim 1, wherein the calibration device comprises the transmitting probe (3), the receiving transducer (4), a wedge block I (53) and a wedge block II (55), wherein the wedge block I (53) and the wedge block II (55) are separated at two ends of a measured object (51), the transmitting probe (3) is disposed on the wedge block I (53) or the wedge block II (55), the receiving transducer (4) is disposed on the wedge block II (55) or the wedge block I (53), the transmitting probe (3) and the receiving transducer (4) are disposed oppositely, and the wedge block I (53) or the wedge block II (55) is located on a plane.

3. A detection method of the stress gradient high-efficiency non-destructive detection system based on frequency domain calculation of broadband swept frequency signals according to claim 1, wherein the stress gradient high-efficiency non-destructive detection method comprises the following steps:

step 1: calibrating an LCR wave velocity of an object to be measured;

step 2: calculating a starting frequency and a cut-off frequency of broadband swept frequency signals based on the LCR wave velocity of the object to be measured in the step 1 and a stress gradient measuring range in a depth direction of the object to be measured;

step 3: converting phase delay to time delay information based on the phase delay of the starting frequency and the cut-off frequency in the step 2; and step 4: determining stresses of depths corresponding to different frequency components based on the time delay information in the step 3 to realize layer-by-layer scanning of the stresses at different depths of the measured object.

4. The detection method of the stress gradient high-efficiency non-destructive detection system based on frequency domain calculation of broadband swept frequency signals according to claim 3, wherein a calibration device for calibrating the LCR wave velocity of the object to be measured in the step 1 comprises the transmitting probe (3), the receiving transducer (4), the wedge block I (53) and the wedge block II (55), wherein the wedge block I (53) and the wedge block II (55) are separated at two ends of a measured object (51), the transmitting probe (3) is disposed on the wedge block I (53) or the wedge block II (55), the receiving transducer (4) is disposed on the wedge block II (55) or the wedge block I (53), the transmitting probe (3) and the receiving transducer (4) are disposed oppositely, and the wedge block I (53) or the wedge block II (55) is located on a plane.

5. The detection method of the stress gradient high-efficiency non-destructive detection system based on frequency domain calculation of broadband swept frequency signals according to claim 4, wherein a propagation velocity of the wedge block in the calibration device in the step 1 is known, and the propagation velocity of the LCR wave of the measured object (51) is calculated by the refraction law; the transmitting probe (3) is excited by a 5-period sine wave modulated by a Hanning window, and at the same time, a data acquisition board is triggered to acquire ultrasonic signals of the receiving transducer (4); deflection angles of the receiving and transmitting probes are adjusted, and the energy of received signals is calculated; when deflection angles of the receiving and transmitting probes meet a first critical refraction angle, the energy of the signal received by the receiving transducer is the highest; and at this time, the propagation velocity of the LCR wave of the measured object meets:

$$c = \frac{c_0}{\sin\theta_0}, \quad (1)$$

where $c_0$ represents the propagation velocity of the wedge block, and $\vartheta_0$ represents the deflection angle of the wedge block.

6. The detection method of the stress gradient high-efficiency non-destructive detection system based on frequency domain calculation of broadband swept frequency signals according to claim 3, wherein the step 2 is was follows: the stress gradient measuring range in the depth direction of the measured object is determined, a starting depth of the measurement is $d_0$, a cut-off depth of the measurement is $d_1$, a starting frequency of linear swept frequency signals is $f_0=c/d_1$, a cut-off frequency is $f_1=c/d_0$, a bandwidth of swept frequency signals is $B=f_1-f_0$, a pulse width of excitation signals is set as T, and then, broadband swept frequency signals can be expressed as:

$$S=\exp(j2\pi Bt^2/T) \quad (2);$$

and the generated broadband swept frequency signal data is loaded into the arbitrary waveform generator so as to generate broadband swept frequency signals for exciting the transmitting probe.

7. The detection method of the stress gradient high-efficiency non-destructive detection system based on frequency domain calculation of broadband swept frequency signals according to claim 3, wherein the step 3 is as follows: excitation signals of the transmitting probe and the acquisition signals of the receiving transducer are respectively subjected to Fast Fourier Transform (FFT), the signals after the FFT comprise the amplitude information of each frequency component as well as the phase information, a phase difference between two signals at the same frequency is calculated, and a relationship between the phase difference Δφ and propagation delay of ultrasonic signals meets:

$$\Delta\varphi = w\Delta t \quad (3),$$

where w represents an angular frequency of signals, and Δt represents delay time of the signal corresponding to the angular frequency.

8. The detection method of the stress gradient high-efficiency non-destructive detection system based on frequency domain calculation of broadband swept frequency signals according to claim 7, wherein the step 4 is as follows:

during the FFT, original signals are expanded, that is, the number of points of the FFT is increased so as to improve a frequency resolution after the FFT and correspondingly improve a stress gradient spatial resolution in the depth direction, the delay times of different frequency components in broadband swept frequency signals are calculated to obtain stresses of different internal depth layers corresponding to the measured object, and finally, the stress gradient measurement in the depth direction of the measured object is realized by means of the superposition relationship of the stresses; and if a measurement depth corresponding to a frequency $f_1$ is $D_1$ and a measured stress value thereof is $\sigma_1$; and a measurement depth corresponding to a frequency $f_2$ is $D_2$ and a measured stress value thereof is $\sigma_2$, a stress value $\sigma_{1-2}$ of the $D_{1-2}$ layer is:

$$\sigma_{1-2} = \frac{\sigma_2 \times (D_2 L) - \sigma_1 \times (D_1 L)}{D_2 L - D_1 L}. \quad (4)$$

* * * * *